US009590762B2

(12) United States Patent
Kloper et al.

(10) Patent No.: US 9,590,762 B2
(45) Date of Patent: Mar. 7, 2017

(54) CONCURRENT ON-CHANNEL SERVICING OF WIRELESS CLIENT TRAFFIC AND OFF-CHANNEL PRE-SCANNING FOR RADAR IN A WIRELESS ACCESS POINT

(71) Applicant: Cisco Technology, Inc., San Jose, CA (US)

(72) Inventors: David Kloper, Santa Clara, CA (US); Raghuram Rangarajan, Santa Clara, CA (US); Greg Corsetto, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 201 days.

(21) Appl. No.: 14/479,521

(22) Filed: Sep. 8, 2014

(65) Prior Publication Data

US 2016/0073403 A1  Mar. 10, 2016

(51) Int. Cl.

| | |
|---|---|
| *H04W 36/22* | (2009.01) |
| *H04W 40/12* | (2009.01) |
| *H04W 72/02* | (2009.01) |
| *H04L 1/00* | (2006.01) |
| *H04W 24/00* | (2009.01) |
| *H04W 16/14* | (2009.01) |

(52) U.S. Cl.
CPC ............... *H04L 1/00* (2013.01); *H04W 16/14* (2013.01); *H04W 24/00* (2013.01)

(58) Field of Classification Search
CPC ..... H04W 16/18; H04W 4/021; H04W 28/10; H04B 1/1027; H04L 41/12; H04L 41/22
USPC ...... 370/235, 329, 338; 375/135; 455/179.1, 455/185.1, 520, 452.2
See application file for complete search history.

(56) References Cited

U.S. PATENT DOCUMENTS

| | | | |
|---|---|---|---|
| 6,714,605 B2 | 3/2004 | Sugar et al. | |
| 6,850,735 B2 | 2/2005 | Sugar et al. | |
| 7,813,744 B2 | 10/2010 | Johnson | |
| 7,864,744 B2 | 1/2011 | Song et al. | |
| 8,849,225 B1 * | 9/2014 | Sullivan | H03J 7/18 455/161.1 |
| 2013/0251001 A1 * | 9/2013 | Lee | H04B 1/715 375/135 |
| 2013/0314267 A1 | 11/2013 | Kenney et al. | |
| 2014/0003237 A1 * | 1/2014 | Kenney | H04W 28/10 370/235 |

(Continued)

OTHER PUBLICATIONS

Cisco, "Dynamic Frequency Selection", Cisco Systems, Inc., 2008, 6 pages.

*Primary Examiner* — Alpus H Hsu
*Assistant Examiner* — Camquyen Thai
(74) *Attorney, Agent, or Firm* — Edell, Shapiro & Finnan, LLC

(57) ABSTRACT

An access point (AP) includes a transceiver to service wireless client traffic on wireless channels within a channel bandwidth. The AP services wireless client traffic in a first channel bandwidth and sets a receiver bandwidth to include the first channel bandwidth and a second channel bandwidth initially not available for servicing wireless client traffic. Concurrent with servicing the wireless client traffic in the first channel bandwidth, the AP searches the second channel bandwidth for any interference signal. If no interference signal is found in the second channel bandwidth, the AP declares the second channel bandwidth free of interference.

24 Claims, 5 Drawing Sheets

(56) References Cited

U.S. PATENT DOCUMENTS

2015/0296413 A1* 10/2015 Sadek ................. H04B 1/1027
375/348
2016/0014613 A1* 1/2016 Ponnampalam ...... H04W 16/18
370/254

* cited by examiner

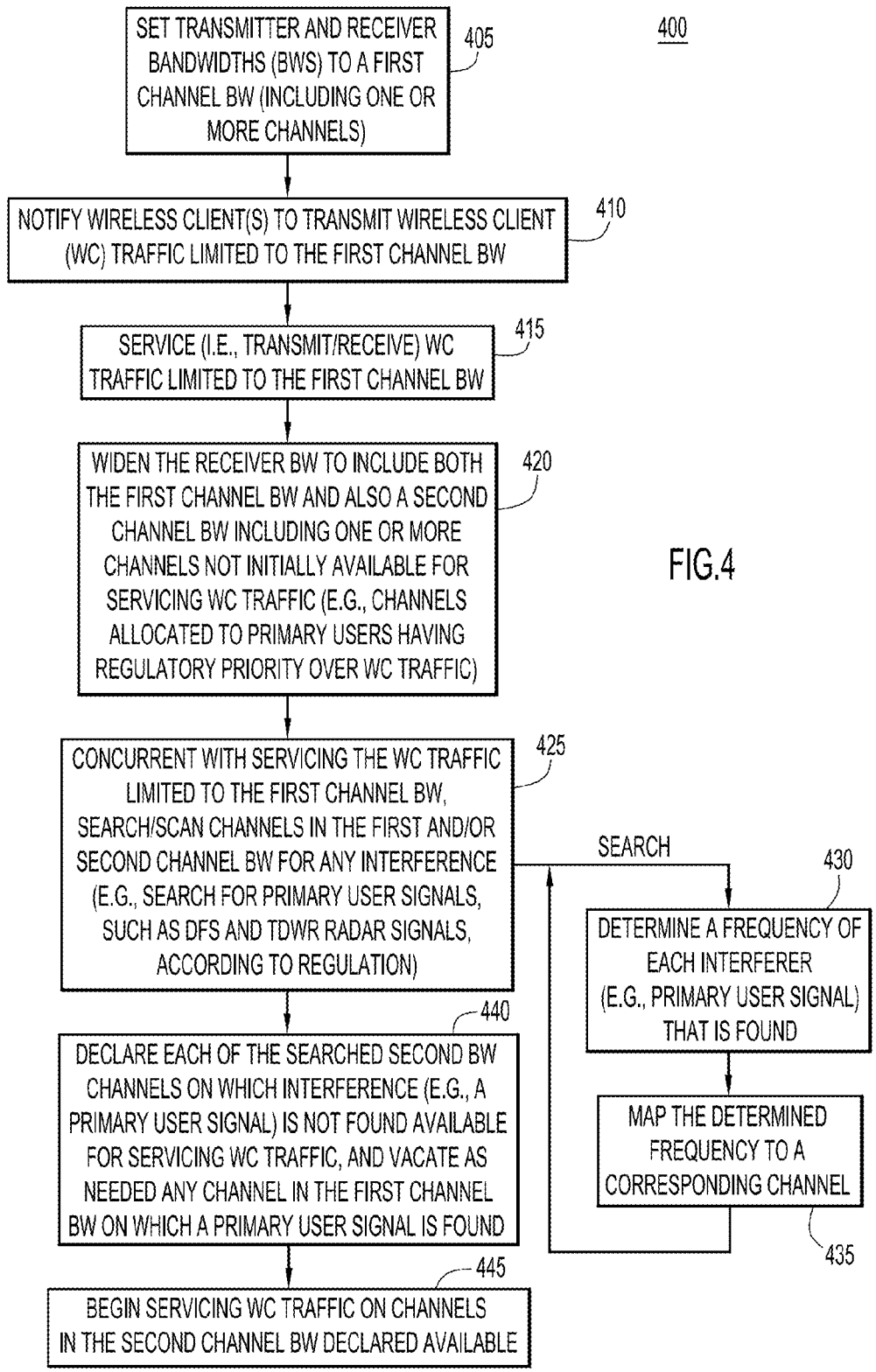

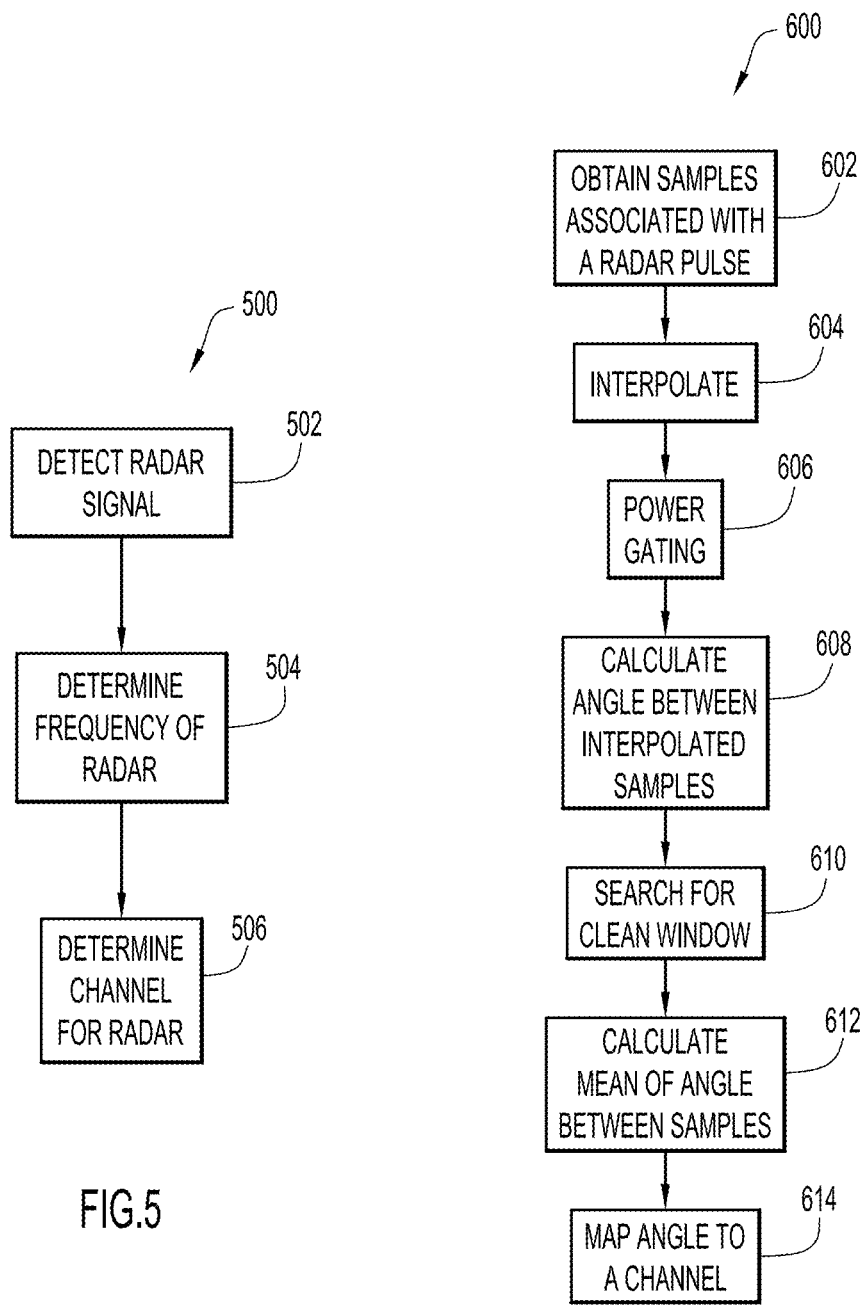

CONCURRENT ON-CHANNEL SERVICING OF WIRELESS CLIENT TRAFFIC AND OFF-CHANNEL PRE-SCANNING FOR RADAR IN A WIRELESS ACCESS POINT

TECHNICAL FIELD

The present disclosure relates to wireless networks.

BACKGROUND

An access point (AP) transmits/receives wireless client traffic to/from wireless clients in a wireless network over wireless channels defined in a frequency allocation spectrum. The spectrum allocates Dynamic Frequency Selection (DFS) channels and Terminal Doppler Weather Radar (TDWR) channels in a 5 GHz band to primary users having priority over wireless client traffic in the allocated channels. Therefore, before the AP can use any DFS or TDWR channel, the AP searches/pre-scans for a primary user on that channel. If the channel is found to be free of a primary user, the AP may then use the channel.

BRIEF DESCRIPTION OF THE DRAWINGS

FIG. 4 is a flowchart of a method of concurrently servicing wireless traffic and searching for primary users performed in the AP, according to an example embodiment.

FIG. 5 is a flowchart of a method of searching for and detecting a presence of a primary user such as, for example, a radar signal on a channel within a relatively wide channel bandwidth that includes multiple relatively narrow channels, according to an example embodiment.

FIG. 6 is a flowchart of a method for determining a frequency of a detected primary user and, in particular, for determining a frequency of a detected radar signal, according to an example embodiment.

DESCRIPTION OF EXAMPLE EMBODIMENTS

Overview

Techniques presented herein relate to operations performed in a wireless access point (AP) to enable the AP to service wireless clients and concurrently search for additional useable channel bandwidth. The AP includes a transceiver to service wireless client traffic on wireless channels within a channel bandwidth. The AP services wireless client traffic in a first channel bandwidth and sets a receiver bandwidth to include the first channel bandwidth and a second channel bandwidth initially not available for servicing wireless client traffic. Concurrent with servicing the wireless client traffic in the first channel bandwidth, the AP searches the second channel bandwidth for any interference signal. If no interference signal is found in the second channel bandwidth, the AP declares the second channel bandwidth free of interference and thus available for servicing wireless client traffic.

Example Embodiments

Figure 1:
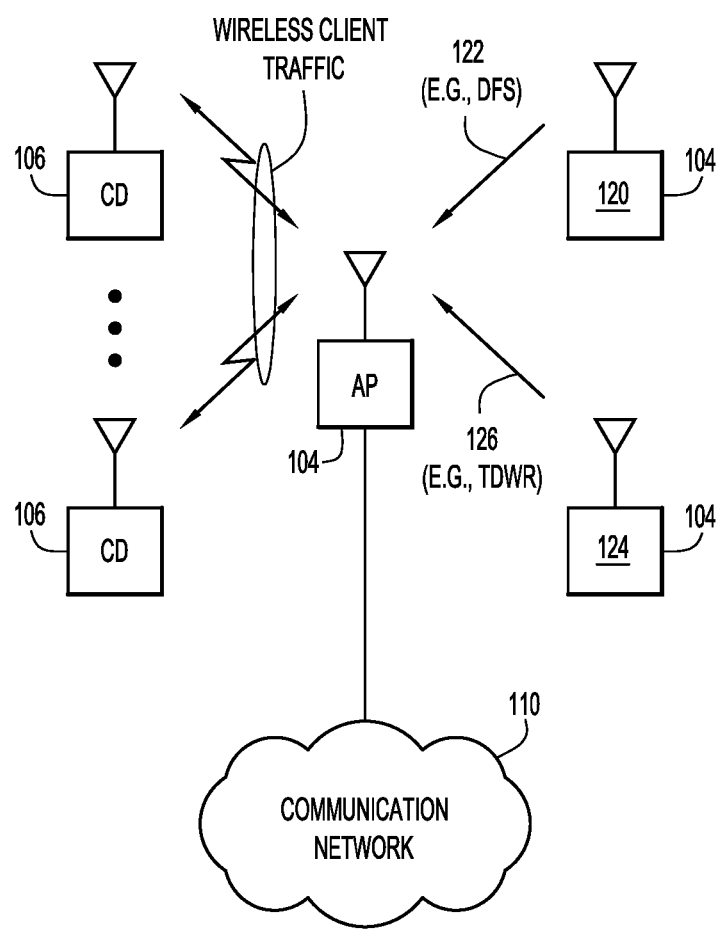
FIG. 1 is a diagram of a wireless communication network environment in which a wireless access point (AP) concurrently services wireless client traffic and searches/pre-scans for interfering priority users, according to an example embodiment.

Referring first to FIG. 1, there is shown a diagram of an example wireless communication network environment 100 in which a wireless access point (AP) concurrently services wireless client (WC) traffic and searches/scans for interfering priority users. Environment 100 includes a wireless AP 104 configured to operate in accordance with any of a number of wireless communication standards, such as, for example, the IEEE 802.11 wireless standard (i.e., "WiFi" standard).

In an example, AP 104 transmits and receives wireless client traffic to and from one or more wireless client devices 106 over wireless channels in a 2.4 GHz frequency band and/or a 5 GHz frequency band. In a downlink direction, AP 104 formats data frames, containing, e.g., voice, video, data, etc., according to the wireless communication standard and transmits the formatted frames to client devices 106 (also referred to simply as "wireless clients" 106). In an uplink direction, AP 104 receives appropriately formatted data frames from client devices 106 and processes the received frames according to the wireless communication standard. In this manner, AP 104 is said to "service" wireless client traffic associated with client devices 106.

Additionally, AP 104 communicates with a communication network 110, which may include one or more wide area networks (WANs), such as the Internet, and one or more local area networks (LANs). AP 104 connects with communication network 110 wirelessly or through wired connections, and services the wireless client traffic associated with each of client devices 106 in order to provide the client devices with access to other client devices connected to the communication network 110.

Although AP 104 may establish and service wireless client traffic associated with clients 106 in the 5 GHz frequency band, that frequency band also includes predetermined frequency bands (and thus channels) allocated to "primary" users that have regulatory priority over the wireless client traffic. Such primary users include radar devices that transmit radar signals on either Dynamic Frequency Selection (DFS) channels or Terminal Doppler Weather Radar (TDWR) channels of the 5 GHz band. In the example of FIG. 1, a radar device 120 transmits a radar signal 122 on any of the DFS channels, while a radar device 124 transmits a TDWR signal 126 on any of the TDWR channels.

Due to primary user priority in the DFS and TDWR bands, before AP 104 may service wireless client traffic on a channel in either the DFS band or the TDWR bands, the AP performs a regulatory search or pre-scan of the channel for a primary user signal (i.e., a radar signal). If the search/pre-scan indicates there is no primary user signal on the channel, AP 104 may use the channel until such time as a DFS signal is detected therein; otherwise, the AP cannot use the channel. The search/pre-scan is considered regulatory because AP 104 performs the search in accordance with search parameters defined by regulation. For example, the DFS and TDWR regulations in the United States specify receiver dwell times, i.e., a length of time that a receiver must listen in a given channel for a radar signal, in a range from 1 minute for a DFS channel up to 10 minutes for a TDWR channel. Thus, a receiver of AP 104 may be required to dwell on a given TDWR channel for up to 10 minutes before the AP can use that channel. Given the long receiver dwell time, it is advantageous for the AP to be able to service wireless client traffic at the same time the AP performs the receiver dwell.

Accordingly, techniques presented below enable AP 104 to service wireless client traffic on one or more channels while the AP searches or pre-scans additional channels for a primary user signal, thus clearing the additional channels for subsequent use by the AP. At a high level, AP 104 opens/expands a receiver bandwidth thereof to include additional channels (referred to as "off-channels") beyond existing channels (referred to as "on-channels") on which the AP is currently servicing wireless client traffic. While servicing the wireless client traffic on the existing channels, AP 104 searches/pre-scans the additional channels for primary users. If no primary users are found, AP 104 begins to service wireless traffic on the additional channels. This technique is referred to herein as "concurrent on-channel servicing of wireless client traffic and off-channel pre-scanning for primary signals (e.g., radar signals)" in a wireless access point.

Figure 2:
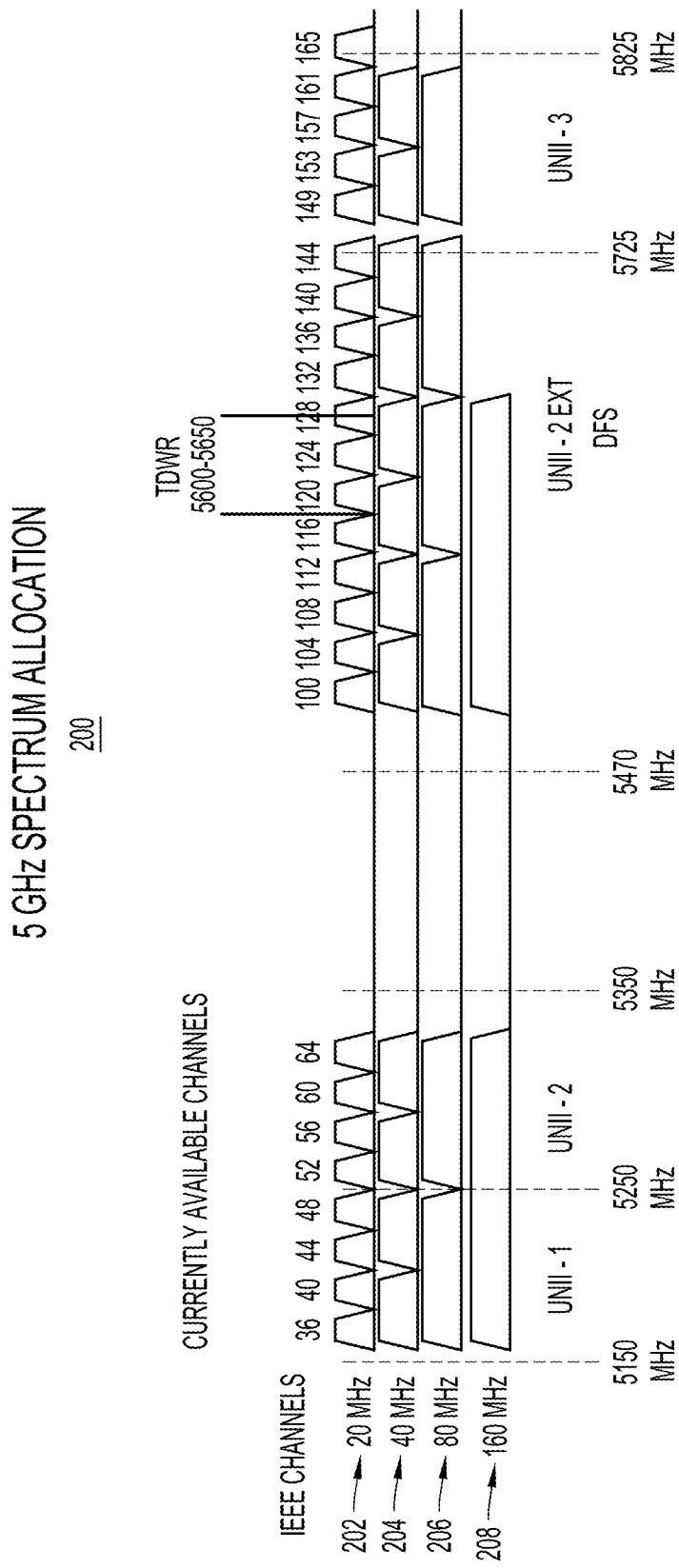
FIG. 2 is an illustration of a frequency allocation spectrum for a 5 GHz frequency band and within which techniques presented herein are employed for off-channel pre-scanning for higher priority users, according to an example embodiment.

With reference to FIG. 2, there is an illustration of a frequency allocation spectrum 200 for the 5 GHz frequency band mentioned above. Spectrum 200 defines individual 20 MHz wireless communication channels 202 sequentially numbered from left-to-right as IEEE channels 36 to 165. Each of channels 202 has a channel bandwidth of 20 MHz.

Specifically allowed sets of adjacent pairs of individual 20 MHz channels 36-165 may be joined/combined to form individual 40 MHz channels 204 each having a 40 MHz bandwidth. For example, 20 MHz channels 36 and 40 may be combined to form a single 40 MHz channel. The 40 MHz channel is considered a relatively wideband channel compared to the two relatively narrowband 20 MHz channels encompassed by the wideband channel. Thus, the term "channel bandwidth" means a range of frequencies that encompasses one or more wireless channels, where each wireless channel may be a relatively narrow band channel or a relatively wideband channel that encompasses multiple narrow band channels. Narrowband channels encompassed by a wideband channel may also be referred to as sub-channels of the wideband channel.

Adjacent pairs of individual 40 MHz channels 204 may be joined/combined to form individual 80 MHz channels 206 each having an 80 MHz bandwidth.

Similarly, adjacent pairs of individual 80 MHz channels 206 may be joined/combined to form individual 160 MHz channels 208.

Channels 202 are divided into Unlicensed National Information Infrastructure (UNII) bands UNII-1 to UNII-3. UNII-1 and UNII-3 bands are non-DFS bands, while UNII-2 and UNII-2 Extended (Ext) are DFS bands that may be used by DFS primary users (e.g., primary user 122 in FIG. 1).

A frequency range of 5600 MHz to 5650 MHz, overlapping with channels 120-128, is allocated to TDWR users (e.g., primary user 126 in FIG. 1).

The spectrum 200 shown in FIG. 2 is presented herein to provide context for the concurrent channel servicing/channel scanning techniques presented herein.

Figure 3:
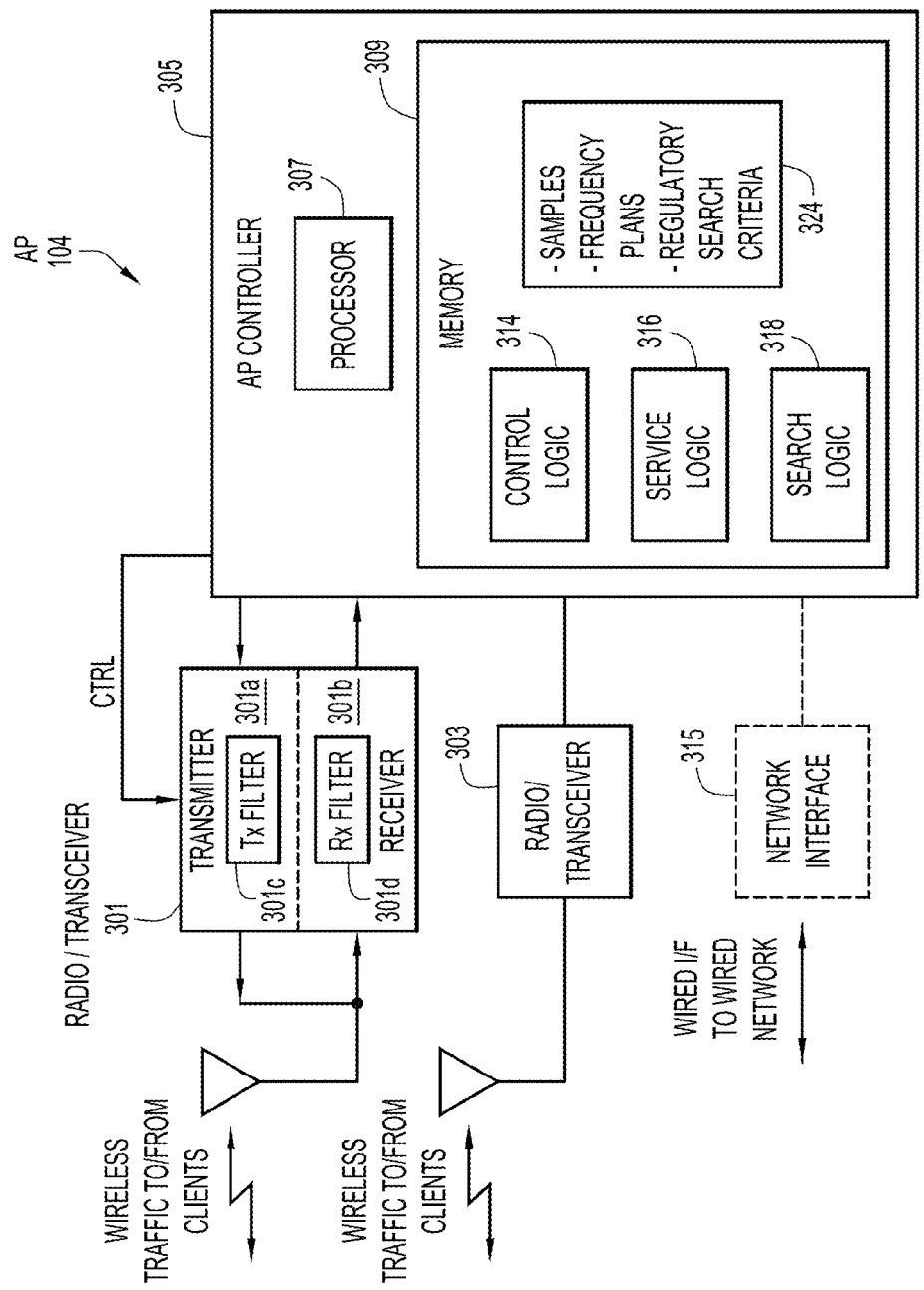
FIG. 3 is a block diagram of the AP from FIG. 1 configured to perform the techniques presented herein, according to an example embodiment.

With now reference to FIG. 3, there is shown an example block diagram of AP 104 configured to perform the techniques presented herein, according to an embodiment. AP 104 includes a first wireless radio 301 (also referred to a wireless transmitter/receiver or "transceiver" 301) to communicate wirelessly with wireless clients in a first frequency band (e.g., a 5 GHz band), a second wireless radio or transceiver 303 to communicate wirelessly with the wireless clients in a second frequency band (e.g., a 2.5 GHz band), and an AP controller 305 to which the radios are coupled. Each of radios 301 and 303 includes a respective set of one or more antennas.

Radio 301 includes a transmitter 301a and a receiver 301b to service wireless client traffic in the downlink and uplink directions, respectively. In the downlink direction, transmitter 301a frequency up-converts, filters, and amplifies baseband traffic from controller 305 and then transmits the resulting RF signal as downlink wireless client traffic to client devices 106. To this end, transmitter 301a includes a programmable transmit filter 301c to band-limit the transmitted wireless client traffic. A bandwidth of transmit filter 301c is set responsive to control commands (CTRL) from controller 305.

In the uplink direction, receiver 301b frequency down-converts, filters, demodulates, and samples uplink wireless client traffic received from client devices 106, to provide baseband demodulated samples representative of the received wireless client traffic to controller 305 for further processing thereof. To this end, receiver 301b includes a programmable receiver filter 301d to band-limit the received wireless traffic in receiver 301b. A bandwidth of receiver filter 301d is set responsive to control commands CTRL from controller 305 independently of the bandwidth of transmit filter 301c. Receiver filter 301d may be implemented in multiple stages in corresponding stages of receiver 301b, including radio frequency (RF), intermediate frequency (IF), and/or baseband stages of the receiver.

Controller 305 programs transmit filter 301c and receiver filter 301d independently of each other to establish a desired transmitter bandwidth and a desired receiver bandwidth, respectively. For example, the respective bandwidths may be programmed to 20, 40, 80, and 160 MHz, or other suitable bandwidths, so as to encompass one or more contiguous communication channels of frequency spectrum allocation 200.

AP 104 may also include a wired network interface unit (NIU) 315, such as an Ethernet network interface card, that enables the AP to connect to communication network 110 (FIG. 1). NIU 315 may also include wireless connection capability.

AP controller 305 includes a processor 307 and a memory 309. Processor 307 is a microcontroller or microprocessor, for example, configured to execute software instructions stored in memory 309. Memory 309 may comprise read only memory (ROM), random access memory (RAM), magnetic disk storage media devices, optical storage media devices, flash memory devices, electrical, optical, or other physical/tangible (e.g., non-transitory) memory storage devices. Thus, in general, memory 309 may comprise one or more computer readable storage media (e.g., a memory device) encoded with software comprising computer executable instructions and when the software is executed (by processor 307) it is operable to perform the operations described herein.

For example, memory 309 stores or is encoded with instructions for Control logic 314 to perform overall control of AP 104 and operate the AP in accordance with techniques presented herein. To this end, Control logic 314 may concurrently invoke (i) Service logic 316 to service/process client traffic in both downlink and uplink directions in accordance with the appropriate communication standard, and (ii) Search logic 318 to search/pre-scan for primary users while the Service logic is servicing the wireless client traffic. For example, Service logic 316 and Search logic 318 may be implemented as independent processes that execute concurrently under control of, and communicate with, Control logic 314.

Memory 309 also stores information/data 324 used by logic 314, 316, and 318 as appropriate including, but not limited to: baseband samples (e.g., I/Q samples) from radios 301 and 303; information describing frequency plans, such as for spectrum allocation 200, that maps frequency ranges to channels and indicates DFS and TDWR channels/frequencies; regulatory search criteria, e.g., channel dwell times for DFS and TDWR signal searches; and WiFi traffic information.

With reference to FIG. 4, there is shown a flowchart of a method 400 of concurrently servicing wireless traffic and searching for primary users performed in AP 104. Example scenarios that serve to illustrate method 400 are described after method 400 is described.

At 405, AP 104 (i.e., controller 305) sets transmitter and receiver bandwidth (BWs) to a first channel bandwidth (also referred to as a "first bandwidth") including one or more channels on which to service wireless client traffic. At 410, AP 104 sends messages to one or more wireless clients (e.g., client devices 106) which are associated with the AP, the messages notifying the wireless clients of the first channel bandwidth and to limit the bandwidth of wireless client traffic transmitted by the wireless clients to that bandwidth. The messages may include channel assignment messages, which assign the one or more communication channels to the wireless clients. For example, AP 104 may send the channel assignment messages to wireless clients 106 in beacon frames. In other words, the messages sent at 410 inform the wireless clients to limit the bandwidth to the first channel bandwidth within which they send transmissions to the AP.

At 415, AP 104 services (i.e., transmits/receives and processes) wireless client traffic associated with wireless clients on the one or more channels in the first channel bandwidth. AP 104 transmits wireless client traffic in the first channel bandwidth and received wireless client traffic in the first channel bandwidth.

At 420, AP 104 widens the receiver bandwidth to include both the first channel bandwidth and a second channel bandwidth (also referred to as a "second bandwidth") that includes one or more channels not initially available for servicing wireless client traffic, i.e., blocked to wireless client traffic. For example, the second channel bandwidth may include one or more channels (i.e., second channel bandwidth channels) allocated to primary users having regulatory priority over the wireless client, e.g., DFS and/or TDWR channels.

At 425, concurrent with servicing (and not degrading) wireless client traffic in the first channel bandwidth, AP 104 searches/pre-scans channels in the second channel bandwidth for any interference. The AP 104 may additionally search the channels in the first channel bandwidth for interference. For example, AP 104 searches/pre-scans for primary user signals, such as DFS and TDWR signals, according to the corresponding regulation. To perform the search/pre-scan: at 430, AP 104 determines a frequency of each interferer (e.g., primary users signal) that is found; and at 435, AP 104 maps the determined frequency to a corresponding channel (e.g., one of channels 36-165 in FIG. 2) based on the stored frequency plan. The search/pre-scan includes a search of each individual channel, e.g., 20 MHz bandwidth channel, included in the searched channel bandwidth. For example, if the searched channel bandwidth is 160 MHz, the search/pre-scan includes a search/pre-scan of each of the eight 20 MHz channels in the full 160 MHz channel bandwidth. Channel search operations 430 and 435 are described in further detail below in connection with FIGS. 5 and 6.

At 440, AP 104 declares each of the searched second channel bandwidth channels (i.e., channels in the second channel bandwidth) on which interference (e.g., a primary user signal) is not found as free of interference and thus available for servicing wireless traffic. Also, to the extent that the first channel bandwidth was searched in addition to the second channel bandwidth, AP 104 vacates any channel in the first channel bandwidth on which a primary user signal is found.

At 445, AP 104 begins servicing wireless client traffic on channels in the second channel bandwidth declared available.

The following example scenarios serve to illustrate method of 400. In a first example scenario, initially, AP 104 sets each of the transmitter and the receiver bandwidths to 20 MHz centered on channel 116, notifies one of wireless clients 106 to operate on that channel, and services wireless client traffic on that channel. Channels 120-128 fall in the TDWR band and are initially unavailable/blocked to wireless client traffic, i.e., have not been pre-scanned and declared available. AP 104 widens the receiver bandwidth to 40 MHz so as to encompass both channels 116 and 120. The AP transmitter bandwidth remains at 20 MHz. Concurrent with servicing wireless traffic on channel 116, AP 104 searches/pre-scans channel 120 for primary signals, and does not find any primary user in that channel. AP 104 declares TDWR channel 120 available for servicing wireless client traffic, i.e., AP 104 unblocks channel 120. AP 104 then opens channel 120 along with channel 116 to wireless client traffic, widens the transmitter bandwidth to 40 MHz so as to encompass both channels 116 and 120. AP 104 notifies wireless clients to operate on both channels 116 and 120, and services wireless client traffic on both channels (for example, as a combined wideband channel).

In a second example scenario, initially, AP 104 sets each of the transmitter and receiver bandwidths to 40 MHz including channels 108 and 112, notifies one of wireless clients 106 to operate on those channel (i.e., on a 40 MHz channel), and services wireless client traffic on those channels. Channels 120-128 are initially unavailable/blocked to wireless client traffic. AP 104 widens the receiver bandwidth to 160 MHz so as to encompass initial channels 108 and 112, and new channels 120-128. The AP transmitter bandwidth remains at 40 MHz. Concurrent with servicing wireless traffic on channels 108 and 112, AP 104 searches/scans channels 120-128 for primary signals, and does not find any primary user in that band. AP 104 declares channels 120-128 available for servicing wireless client traffic. AP 104 then opens channels 120-128 along with channel 116 to wireless client traffic, widens the transmitter bandwidth to 160 MHz so as to encompass channels 108, 112, and 120-128. AP 104 notifies wireless clients to operate in the 160 MHz channel bandwidth (i.e., on a wideband channel), and services wireless client traffic in that bandwidth.

With reference to FIG. 5, there is a flowchart of a method 500 of searching for and detecting a presence of a primary user such as, for example, a radar signal on a channel within a channel bandwidth corresponding to a wideband channel that includes multiple (individual) narrowband channels, e.g., multiple 20 MHz channels. Method 500 is performed by Search logic 316.

At 502, energy events for a time period are examined to determine whether pulses or other energy events indicative of the presence of a radar signal are found during the time period. A radar signal is determined to be present responsive to detecting pulses or other energy events indicative of the presence of a radar signal.

At 504, the frequency of the radar signal is determined. In an example embodiment, as will be described in more detail in FIG. 6, interpolated samples are generated (the samples are accessed from data 324 in memory 309), a start of pulse is located, and a mean of angles between samples for a plurality of samples is computed, and the angle corresponding to the mean is employed for converting from the time domain to the frequency domain.

At 506, a channel corresponding to the frequency of the radar signal is determined. In an embodiment, the channel is determined by mapping the frequency of the radar signal to the channels in the frequency plan stored in memory 309.

With reference to FIG. 6, there is a flowchart of a method 600 of determining a frequency of a detected primary user and, in particular, determining a frequency of a detected radar signal. The method 600 is performed by Search logic 316.

At 602, multiple samples are obtained for a channel bandwidth that includes multiple channels. For example, for a channel bandwidth of 160 MHz (i.e., a wideband channel) that contains two 80 MHz channels, four 40 MHz channels, eight 20 MHz channels, or any combination of 20/40/80 MHz channels (e.g., one 80 MHz channel, one 40 MHz channel, two 20 MHz channels, etc.).

At 604, interpolated samples are calculated. The interpolated samples may be limited to a time period of particular interest (e.g., a time period where pulses indicate the start of a radar signal are detected). Interpolation changes the sampling period in time domain to a finer granularity (interpolating intermediate points).

At 606, power gating is employed to search for the start of a pulse that is saturating the ADC. At 608, the angle between interpolated samples is calculated.

At 610, a search for a clean window is made during a predetermined time period from the start of the pulse (e.g., the first 0.5 microseconds).

At 612, a mean of the plurality of angles between a plurality of samples (such as I/Q samples) is computed.

At 614, the frequency determined from the mean of the angle between the plurality of I/Q samples is mapped to an (individual) channel or a wideband channel that comprises multiple channels.

Techniques presented herein implemented in an AP involve concurrent servicing of wireless client traffic in a first channel bandwidth and pre-scanning or searching for primary users in a second channel bandwidth. The AP sets its receiver bandwidth to be wider than the channel bandwidth advertised (in a beacon, for example) to wireless clients. For example, the AP notifies wireless clients to operate only on a 40 MHz channel, thus limiting their transmissions, while the AP receiver channel bandwidth is set to 80 MHz or 160 MHz, so as to encompass the 40 MHz channel and additional channels. The AP also limits its transmitter bandwidth to the 40 MHz channel bandwidth. If the 80 or 160 MHz receive bandwidth straddles the TDRW band, for example, the AP is able to concurrently service clients in the 40 MHz channel and pre-scan the remainder of the 80 or 160 MHz channel bandwidth for DFS/TDWR radar. Thus, the pre-scan is performed without taking the AP out of service.

Once the remainder of the 80 or 160 MHz is pre-scanned and determined to be free from radar (i.e., "open"), the AP may: a) switch to servicing wireless clients in the wider bandwidth; b) keep the wider bandwidth but move the current operation in the 40 MHz channel into the opened channel (i.e., pre-scanned channel) allowing another AP to use the vacated spectrum; c) repeat the process on this new channel to open additional DFS channels. This also gives the AP the option of either operating on a narrower bandwidth temporarily to open more spectrum or, when administratively configured to a narrower bandwidth, leveraging the wider receiver bandwidth to open new channels.

In summary, in one form, a method is provided comprising: in an access point (AP) including a transceiver to service wireless client traffic on wireless channels within a channel bandwidth: servicing wireless client traffic in a first channel bandwidth; setting a receiver bandwidth to include the first channel bandwidth and a second channel bandwidth initially not available for servicing wireless client traffic; concurrent with servicing the wireless client traffic in the first channel bandwidth, searching the second channel bandwidth for any interference signal; and if no interference signal is found in the second channel bandwidth, declaring the second channel bandwidth free from interference.

In another form, an apparatus is provided comprising: a network interface unit to communicate with a network; a transceiver to transmit/receive wireless client traffic to/from wireless clients in a channel bandwidth; a processor coupled to the network interface unit and the transceiver, and configured to: service wireless client traffic in a first channel bandwidth; set a receiver bandwidth to include the first channel bandwidth and a second channel bandwidth initially not available for servicing wireless client traffic; concurrent with servicing the wireless client traffic in the first channel bandwidth, search the second channel bandwidth for any interference signal; and if no interference signal is found in the second channel bandwidth, declare the second channel bandwidth free from interference.

In yet another form, a non-transitory computer readable tangible storage media is provided. The media is encoded with instructions that, when executed by a processor, cause the processor in a wireless access point device to: service wireless client traffic in a first channel bandwidth; set a receiver bandwidth to include the first channel bandwidth and a second channel bandwidth initially not available for servicing wireless client traffic; concurrent with servicing the wireless client traffic in the first channel bandwidth, search the second channel bandwidth for any interference signal; and if no interference signal is found in the second channel bandwidth, declare the second channel bandwidth free from interference.

Although the techniques are illustrated and described herein as embodied in one or more specific examples, it is nevertheless not intended to be limited to the details shown, since various modifications and structural changes may be made within the scope and range of equivalents of the claims.

What is claimed is:
1. A method comprising:
in an access point (AP) including a transceiver to service wireless client traffic on wireless channels within a channel bandwidth:
servicing the wireless client traffic in a first channel bandwidth;
setting a receiver bandwidth to include the first channel bandwidth and a second channel bandwidth initially not available for servicing the wireless client traffic, the second channel bandwidth including one or more second channel bandwidth channels allocated to primary users having regulatory priority over the wire- less client traffic, and wherein setting the receiver bandwidth includes setting the second channel bandwidth to include one or more radar channels or one or more Dynamic Frequency Selection (DFS) channels;

concurrent with servicing the wireless client traffic in the first channel bandwidth, searching the second channel bandwidth for any interference associated with transmissions other than the wireless client traffic, including a primary user signal, the searching including searching for radar in the one or more radar channels or radar in the one or more DFS channels in accordance with DFS regulations; and if no interference is found in the second channel bandwidth, declaring the second channel bandwidth free from interference.

2. The method of claim 1, wherein:
the declaring includes declaring each second channel bandwidth channel that is found to be free of the primary user signal available for servicing the wireless client traffic.

3. The method of claim 2, wherein:
the searching includes searching each of one or more channels within the first channel bandwidth in addition to each channel in the second channel bandwidth for any primary user signals; and
stop servicing the wireless client traffic on the first channel bandwidth channels on which the primary user signal is found.

4. The method of claim 3, wherein the searching includes:
determining a frequency of each primary user signal found as a result of the searching; and
mapping the determined frequency to a corresponding channel.

5. The method of claim 1, wherein the one or more radar channels include one or more Terminal Doppler Weather Radar (TDWR) channels and the searching for radar in the one or more radar channels includes searching for radar in the one or more TDWR channels in accordance with TDWR regulations.

6. The method of claim 1, further comprising, notifying one or more wireless clients to transmit the wireless client traffic in the first channel bandwidth.

7. The method of claim 6, further comprising, prior to the notifying, setting the receiver bandwidth to only the first channel bandwidth.

8. The method of claim 1, wherein the servicing the wireless client traffic includes transmitting the wireless client traffic in the first channel bandwidth.

9. The method of claim 1, wherein the first and second receiver bandwidths correspond to contiguous channels.

10. The method of claim 1, further comprising servicing the wireless client traffic on at least one of the second channel bandwidth channels that is declared free of interference.

11. An apparatus comprising:
a network interface unit to communicate with a network;
a transceiver to transmit/receive wireless client traffic to/from wireless clients in a channel bandwidth;
a processor coupled to the network interface unit and the transceiver, and configured to:
service the wireless client traffic in a first channel bandwidth;
set a receiver bandwidth to include the first channel bandwidth and a second channel bandwidth initially not available for servicing the wireless client traffic, the second channel bandwidth including one or more second channel bandwidth channels allocated to primary users having regulatory priority over the wireless client traffic, and wherein the second channel bandwidth includes one or more radar channels or one or more Dynamic Frequency Selection (DFS) channels;

concurrent with servicing the wireless client traffic in the first channel bandwidth, search the second channel bandwidth for any interference associated with transmissions other than the wireless client traffic, including a primary user signal, radar in the one or more radar channels or radar in the one or more DFS channels in accordance with DFS regulations; and if no interference is found in the second channel bandwidth, declare the second channel bandwidth free from interference.

12. The apparatus of claim 11, wherein the processor is configured to:
declare by declaring each second channel bandwidth channel that is found to be free of the primary user signal available for servicing the wireless client traffic.

13. The apparatus of claim 12, wherein the processor is configured to:
search by searching each of one or more channels within the first channel bandwidth in addition to each channel in the second channel bandwidth for any primary user signals; and
stop servicing the wireless client traffic on any of the first channel bandwidth channels on which the primary user signal is found.

14. The apparatus of claim 13, wherein the processor is further configured to search by:
determining a frequency of each primary user signal found as a result of the search; and
mapping the determined frequency to a corresponding channel.

15. The apparatus of claim 11, wherein the one or more radar channels include one or more Terminal Doppler Weather Radar (TDWR) channels and the processor is configured to search by searching for radar in the one or more TDWR channels in accordance with TDWR regulations.

16. The apparatus of claim 11, further comprising: notifying one or more wireless clients to transmit the wireless client traffic in the first channel bandwidth.

17. The apparatus of claim 11, further comprising: servicing the wireless client traffic on at least one of the second channel bandwidth channels that is declared free of interference.

18. A non-transitory computer readable tangible storage media encoded with instructions that, when executed by a processor, cause the processor in a wireless access point device to:
service wireless client traffic in a first channel bandwidth;
set a receiver bandwidth to include the first channel bandwidth and a second channel bandwidth initially not available for servicing the wireless client traffic, the second channel bandwidth including one or more second channel bandwidth channels allocated to primary users having regulatory priority over the wireless client traffic, and wherein the second channel bandwidth includes one or more radar channels or one or more Dynamic Frequency Selection (DFS) channels;
concurrent with servicing the wireless client traffic in the first channel bandwidth, search the second channel bandwidth for any interference associated with transmissions other than the wireless client traffic, including a primary user signal, radar in the one or more radar channels or radar in the one or more DFS channels in accordance with DFS regulations; and if no interference is found in the second channel bandwidth, declare the second channel bandwidth free from interference.

19. The computer readable storage media of claim 18, wherein the instructions include instructions to cause the processor to:

declare each second channel bandwidth channel that is found to be free of the primary user signal available for servicing the wireless client traffic.

20. The computer readable storage media of claim 19, further comprising instructions cause the processor to:

search by searching each of one or more channels within the first channel bandwidth in addition to each channel in the second channel bandwidth for any primary user signals; and stop servicing the wireless client traffic on any of the first channel bandwidth channels on which the primary user signal is found.

21. The computer readable storage media of claim 20, wherein the instructions to search include instructions to cause the processor to:

determine a frequency of each primary user signal found as a result of the searching; and map the determined frequency to a corresponding channel.

22. The computer readable storage media of claim 18, wherein the one or more radar channels include one or more Terminal Doppler Weather Radar (TDWR) channels and the instructions include instructions to cause the processor to search for radar in the one or more TDWR channels in accordance with TDWR regulations.

23. The computer readable storage media of claim 18, further comprising instructions to cause the processor to: notify one or more wireless clients to transmit the wireless client traffic in the first channel bandwidth.

24. The computer readable storage media of claim 18, further comprising instructions to cause the processor to: service the wireless client traffic on at least one of the second channel bandwidth channels that is declared free of interference.

* * * * *